(12) United States Patent
Bag et al.

(10) Patent No.: US 11,424,948 B2
(45) Date of Patent: Aug. 23, 2022

(54) MANAGING COMMUNICATION BETWEEN GATEWAY AND BUILDING AUTOMATION DEVICE

(71) Applicant: ABB AG, Mannheim (DE)

(72) Inventors: Gargi Bag, Vaesteras (SE); Zhibo Pang, Vaesteras (SE); Morgan Johansson, Vaesteras (SE)

(73) Assignee: ABB AG, Mannheim (DE)

( * ) Notice: Subject to any disclaimer, the term of this patent is extended or adjusted under 35 U.S.C. 154(b) by 523 days.

(21) Appl. No.: 15/983,144

(22) PCT Filed: Nov. 20, 2015

(86) PCT No.: PCT/EP2015/077242
§ 371 (c)(1),
(2) Date: May 18, 2018

(87) PCT Pub. No.: WO2017/084718
PCT Pub. Date: May 26, 2017

(65) Prior Publication Data
US 2018/0323997 A1    Nov. 8, 2018

(51) Int. Cl.
*H04L 12/28* (2006.01)
*H04W 4/70* (2018.01)
(Continued)

(52) U.S. Cl.
CPC ............ *H04L 12/2834* (2013.01); *G06F 8/61* (2013.01); *G06F 8/65* (2013.01); *H04L 12/28* (2013.01); *H04L 12/2814* (2013.01); *H04L 12/4625* (2013.01); *H04L 41/082* (2013.01); *H04L 41/085* (2013.01); *H04L 67/34* (2013.01); *H04L 69/18* (2013.01); *H04W 4/70* (2018.02); *H04L 41/0809* (2013.01); *H04W 4/80* (2018.02)

(58) Field of Classification Search
CPC ... H04L 12/2834; H04L 12/2814; H04W 4/70
See application file for complete search history.

(56) References Cited

U.S. PATENT DOCUMENTS 8,219,660 B2    7/2012  McCoy et al.
10,142,122 B1 *  11/2018  Hill ..................... H04L 12/2807
(Continued)

OTHER PUBLICATIONS

Gill etal, A ZigBee-Based Home Automation System, May 2009, IEEE Transactions on Consumer Electronics, vol. 55, pp. 422-430 (Year: 2009).*

*Primary Examiner* — John A Follansbee
*Assistant Examiner* — Raqiul A Choudhury
(74) *Attorney, Agent, or Firm* — Leydig, Voit & Mayer, Ltd.

(57) ABSTRACT

A method for managing communication with a building automation device, the method being performed in a gateway, the method including the steps of: establishing communication with the building automation device over a first communication protocol; installing executable software instructions on the building automation device over the first communication protocol to provide a capability to communicate over a second communication protocol; and establishing communication with the building automation device over the second communication protocol.

14 Claims, 3 Drawing Sheets

(51) Int. Cl.
*H04L 69/18* (2022.01)
*H04L 41/082* (2022.01)
*G06F 8/65* (2018.01)
*H04L 12/46* (2006.01)
*H04L 67/00* (2022.01)
*H04L 41/085* (2022.01)
*G06F 8/61* (2018.01)
*H04L 41/0806* (2022.01)
*H04W 4/80* (2018.01)

(56) References Cited

U.S. PATENT DOCUMENTS

| | | | |
|---|---|---|---|
| 2003/0140129 A1 | 7/2003 | Livnat et al. | |
| 2007/0043476 A1* | 2/2007 | Richards | G05B 15/02 |
| | | | 700/276 |
| 2012/0299509 A1* | 11/2012 | Lee | H04L 61/6081 |
| | | | 315/291 |
| 2013/0086195 A1* | 4/2013 | Hiniker | H04L 12/2836 |
| | | | 709/208 |
| 2013/0218347 A1* | 8/2013 | Jung | G06Q 30/02 |
| | | | 700/275 |
| 2014/0282486 A1 | 9/2014 | Hisamoto et al. | |
| 2014/0344800 A1 | 11/2014 | Ohs et al. | |
| 2014/0358285 A1* | 12/2014 | Aggarwal | H04L 12/6418 |
| | | | 700/275 |

\* cited by examiner

MANAGING COMMUNICATION BETWEEN GATEWAY AND BUILDING AUTOMATION DEVICE

CROSS-REFERENCE TO PRIOR APPLICATION

This application is a continuation of International Patent Application No. PCT/EP2015/077242, filed on Nov. 20, 2015, the entire disclosure of which is hereby incorporated by reference herein.

FIELD

The invention relates to methods, a gateway, a building automation device, computer programs and computer program products for managing communication between a building automation device and a gateway.

BACKGROUND

Building Automation (BA) is an area where communication technology is used to influence how a building is managed. Building automation can be used both for data retrieval using sensors, and for affecting building systems using actuators. A control unit can use input from the sensors and thereby influence various aspects of the building using the actuators. The sensors can e.g. be temperature sensors, humidity sensors, door/window opening sensors, cameras, IR detectors, etc. Actuators can e.g. be used to control heating, ventilation, air conditioning (HVAC), alarms, door openers, etc. Sensors and actuators are collectively denoted building automation devices.

Each building automation device can be quite small and may be restricted in terms of communication capabilities, memory, processing capabilities, energy usage, etc.

Recently, wireless technology has been introduced in the field of building automation. The building automation devices can then communicate with a gateway, which in turn is in communication with a local and/or remote control device. However, since there are so many different wireless communication protocols, it gets very complicated to support all wireless communication protocols, or at least a wireless common communication protocol which can be used for communication between the gateway and the building automation device. Moreover, different building automation devices typically originate from different manufacturers and these may thus support different communication protocols, further complicating the compatibility problems.

U.S. Pat. No. 8,219,660 presents a building automation system (BAS) network manager supporting a plurality of device protocols coupled to at least one communication network, and a plurality of logical connections to individual BAS networks to multiple end devices of a BAS. The BAS network manager can communicate with each of the end devices regardless of the protocol or protocol version of the BAS network by implementing a protocol stack above the link layer for each protocol or protocol version, providing an integrated multi-BAS network interface, and maintaining a device identifier for each BAS network the network manager is coupled to in the protocol stack. However, this solution provides a complicated solution to the problem, requiring simultaneous support for several protocols. This is not only complicates the real-time processing in the network manager, but also causes interference between different protocols.

SUMMARY

In an embodiment, the present invention provides a method for managing communication with a building automation device, the method being performed in a gateway and comprising the steps of: establishing communication with the building automation device over a first communication protocol; installing executable software instructions on the building automation device over the first communication protocol to provide a capability to communicate over a second communication protocol; and establishing communication with the building automation device over the second communication protocol.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
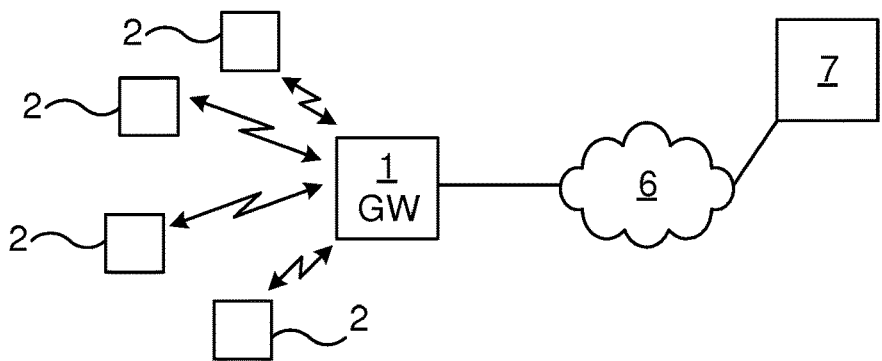
FIG. 1 is a schematic diagram illustrating an environment in which embodiments presented herein can be applied.

According to a first aspect, it is provided a method for managing communication with a building automation device. The method is performed in a gateway and comprises the steps of: establishing communication with the building automation device over a first communication protocol; installing executable software instructions on the building automation device over the first communication protocol, to provide a capability to communicate over a second communication protocol; and establishing communication with the building automation device over the second communication protocol.

The first communication protocol and the second communication protocol may be media access control, MAC, level protocols.

The first communication protocol and the second communication protocol may be physical level protocols.

The first communication protocol and the second communication protocol may both be selected from the group consisting of 6LOWPAN, IPv6 over Low power Wireless Personal Area Networks, IEEE 802.15.4, ZigBee, Thread, Bluetooth, Bluetooth Low Energy, Digital Enhanced Cordless Telecommunications Ultra Low Energy, DECT ULE, and EnOcean.

The second communication protocol may be a later revision of the first communication protocol.

According to a second aspect, it is provided a gateway for managing communication with a building automation device. The gateway comprises: a processor; and a memory storing instructions that, when executed by the processor, cause the gateway to: establish communication with the building automation device over a first communication protocol; install executable software instructions on the building automation device over the first communication protocol, to provide a capability to communicate over a second communication protocol; and establish communication with the building automation device over the second communication protocol.

The first communication protocol and the second communication protocol may be media access control, MAC, level protocols.

The first communication protocol and the second communication protocol may be physical level protocols.

The first communication protocol and the second communication protocol may both be selected from the group consisting of 6L0WPAN, IPv6 over Low power Wireless Personal Area Networks, IEEE 802.15.4, ZigBee, Thread, Bluetooth, Bluetooth Low Energy, Digital Enhanced Cordless Telecommunications Ultra Low Energy, DECT ULE, and EnOcean.

The second communication protocol may be a later revision of the first communication protocol.

According to a third aspect, it is provided a computer program for managing communication with a building automation device. The computer program comprises computer program code which, when run on a gateway causes the gateway to: establish communication with the building automation device over a first communication protocol; install executable software instructions on the building automation device over the first communication protocol, to provide a capability to communicate over a second communication protocol; and establish communication with the building automation device over the second communication protocol.

According to a fourth aspect, it is provided a computer program product comprising a computer program according to the third aspect and a computer readable means on which the computer program is stored.

According to a fifth aspect, it is provided a method for managing communication with a gateway. The method is performed in a building automation device and comprises the steps of: establishing communication with the gateway over a first communication protocol; receiving, from the gateway over the first communication protocol, a command to install a capability to communicate over a second communication protocol; receiving executable software instructions to be used for communication over the second communication protocol; installing the executable software instructions to provide the capability to communicate over the second communication protocol; and establishing communication with the gateway over the second communication protocol.

The method may further comprise the step of: accepting communication over the first communication protocol for a predetermined duration when the building automation device is powered on.

According to a sixth aspect, it is provided a building automation device for managing communication with a gateway. The building automation device comprises: a processor; and a memory storing instructions that, when executed by the processor, cause the building automation device to: establish communication with the gateway over a first communication protocol; receive, from the gateway over the first communication protocol, a command to install a capability to communicate over a second communication protocol; receive executable software instructions to be used for communication over the second communication protocol; install the executable software instructions to provide the capability to communicate over the second communication protocol; and establish communication with the gateway over the second communication protocol.

The building may further comprise instructions that, when executed by the processor, cause the building automation device to: accept communication over the first communication protocol for a predetermined duration when the building automation device is powered on.

According to a seventh aspect, it is provided a computer program for managing communication with a gateway. The computer program comprises computer program code which, when run on a building automation device causes the building automation device to: establish communication with the gateway over a first communication protocol; receive, from the gateway over the first communication protocol, a command to install a capability to communicate over a second communication protocol; receive executable software instructions required for communication over the second communication protocol; install the executable software instructions to provide the capability to communicate over the second communication protocol; and establish communication with the gateway over the second communication protocol.

According to an eighth aspect, it is provided a computer program product comprising a computer program according to the seventh aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 is a schematic diagram illustrating an environment in which embodiments presented herein can be applied. A gateway t is capable of wireless communication with a plurality of building automation devices 2, e.g. being sensors and/or actuators, used for building automation. Examples of sensors are temperature sensors, humidity sensors, door/window opening sensors, cameras, IR detectors, etc. Actuators can e.g. be used to control heating, ventilation, air conditioning (HVAC), alarms, door openers, etc. Each building automation device 2 can be quite small and may be restricted in terms of communication capabilities, power consumption and/or processing power.

The gateway 1 provides connectivity for the building automation devices 2 to a network 6, such as a local area network (LAN) or the Internet, whereby each building automation device 2 can communicate with a suitable control node 7. The control node 7 can e.g. be a server, client and/or control terminal, which can read information from a sensor and/or trigger actuation of an actuator of the building automation devices 2. For instance, the control node 7 can in this way be used for HVAC, alarms, access management, etc.

The inventors have realised by providing the building automation devices 2 with a known first communication protocol, this first communication protocol can be exploited to install support for a second communication protocol. In this way, the building automation devices 2 can be provided without the need to support all possible communication protocols which greatly simplifies deployment and reduces compatibility issues between gateway 1 and building automation devices 2. Moreover, the communication protocol used between the gateway 1 and the building automation devices 2 can be upgraded to support a later version or a completely new wireless communication protocol. The first communication protocol can optionally be quite basic and only needs to be used to allow installation of the second communication protocol.

Figures 2A, 2B:
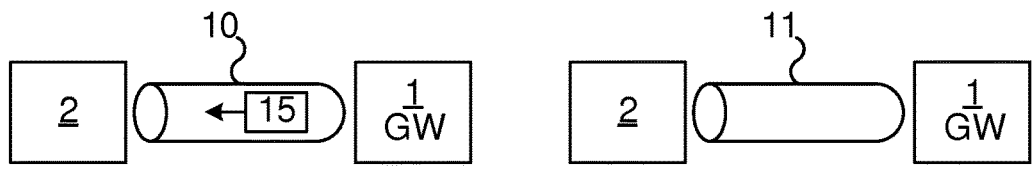
FIGS. 2A-B are schematic diagrams illustrating communication between the gateway and a building automation device of FIG. 1 using two different protocols.

FIGS. 2A-B are schematic diagrams illustrating communication between the gateway and a building automation device of FIG. 1 using two different protocols.

FIG. 2A discloses a first communication protocol 10 used for communication between the gateway t and the building automation device 2. Support for this first communication protocol 10 is preinstalled in the building automation device 2, whereby the building can communicate with the gateway 1 using the first communication protocol 10 without any additional installation when the building automation device 2 is deployed.

Using the first communication protocol, the gateway t can send executable software instructions 15 to be installed in the building automation device 2. The executable software instructions 15, once installed, are used to provide support for a second communication protocol. In FIG. 2B, it is shown how the second communication protocol 11 is set up and communication can occur between the building automation device 2 and the gateway 1 using the second communication protocol 11. It is to be noted that also the second communication protocol 11 can optionally be used to provide new executable software instructions for supporting a third communication protocol, etc.

Figure 3:
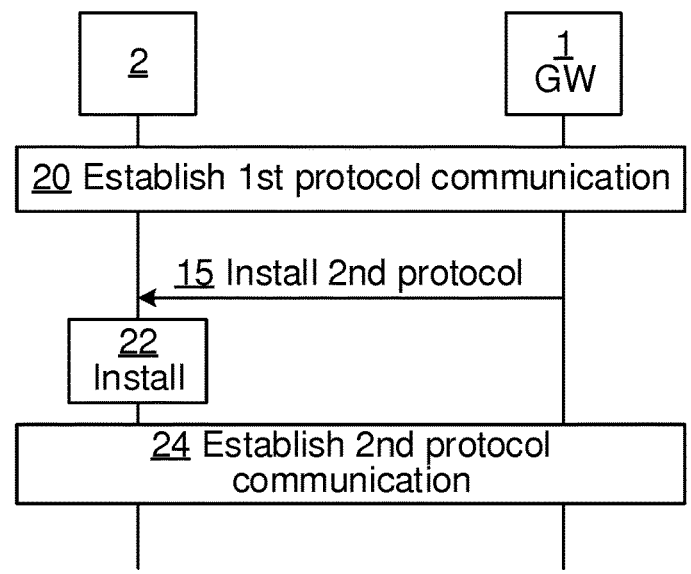
FIG. 3 is a sequence diagram illustrating the communication flow between the gateway and a building automation device of FIG. 1.

FIG. 3 is a sequence diagram illustrating the communication flow between the gateway 1 and a building automation device 2 of FIG. 1.

First, communication over the first communication protocol between the building automation device 2 and the gateway 1 is established 20.

The gateway 1 then remotely triggers installation of executable software instructions 15 at the building automation device 2. The building automation device 2 subsequently installs 22 the executable software instructions to provide support for the second communication protocol. Once the executable software instructions 15 are installed, communication over the second communication protocol between the building automation device 2 and the gateway 1 is established 24.

Figure 4:
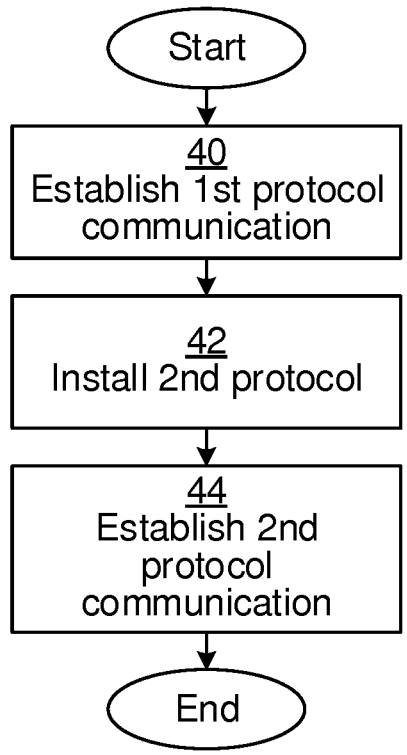
FIG. 4 is a flow chart managing communication with a building automation device, performed in the gateway of FIG. 1 according to one embodiment.

FIG. 4 is a flow chart managing communication with a building automation device, performed in the gateway of FIG. 1 according to one embodiment.

In an establish 1st protocol communication step 40, communication is established with the building automation device over a first communication protocol. For instance, the first communication protocol can be 6LoWPAN(IPv6 (Internet Protocol version 6) over Low power Wireless Personal Area Networks) or any other suitable communication protocol. The first communication protocol is predefined and support for the first communication protocol is provided in the building automation device prior to deployment.

In an install 2nd protocol step 42, executable software instructions are installed on the building automation device over the first communication protocol. In other words, as shown in FIG. 2A, the gateway transmits the executable software instructions to the building automation device using the first communication protocol. Once installed, the executable software instructions allows the building automation device to communicate over a second communication protocol.

In an establish 2nd protocol communication step 44, communication is established with the building automation device over the second communication protocol.

The first communication protocol and the second communication protocol are can be media access control, MAC, level protocols and/or physical layer protocols. For instance, the first communication protocol and the second communication protocol can both selected from the group consisting of 6L0WPAN, IEEE 802.15.4, ZigBee, Thread, Bluetooth, Bluetooth Low Energy, Digital Enhanced Cordless Telecommunications Ultra Low Energy (DECT ULE), and EnOcean. It is equally possible that the second communication protocol is a later revision of the first communication protocol, allowing upgrades of the communication protocol which is used for communication between the gateway and the building automation device.

Figure 5:
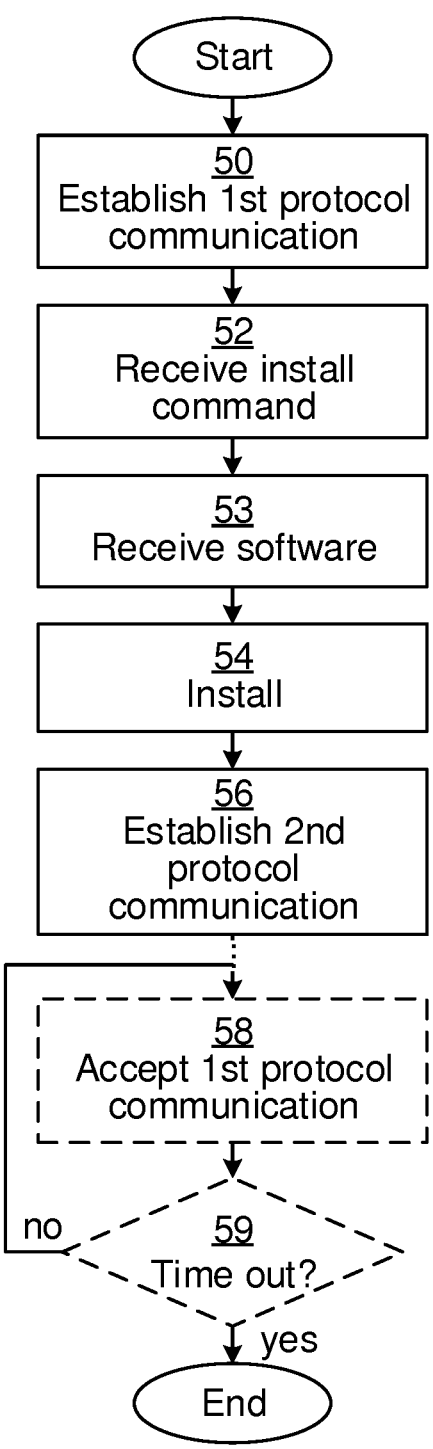
FIG. 5 is a flow chart managing communication with a gateway, performed in a building automation device of FIG. 1 according to one embodiment.

FIG. 5 is a flow chart managing communication with a gateway, performed in a building automation device of FIG. 1 according to one embodiment.

In an establish 1st protocol communication step 50, communication is established with the gateway over a first communication protocol. As explained above, the first communication protocol is installed in the building automation device prior to deployment, or at least as part of the deployment process.

In a receive install command step 52, a command is received from the gateway over the first communication protocol. The command instructs the building automation device to install a capability to communicate over a second communication protocol.

In a receive software step 53, executable software instructions are received. The executable software instructions are to be used for communication over the second communication protocol.

Steps 52 and 53 corresponds to FIG. 2A and is explained above. Optionally, the install command and the executable software instructions are received as one package.

In an install step 54, the executable software instructions are installed to provide the capability to communicate over the second communication protocol.

In an establish 2nd protocol communication step 56, communication is established with the gateway over the second communication protocol.

In an optional accept 1st protocol communication step 58, communication over the first communication protocol is accepted by the building automation device. This step can conditionally be performed e.g. if communication over the second communication protocol is lost or if the building automation device is restarted.

In an optional conditional time out step 59, it is determined whether a predetermined duration has passed after powering on the building automation device. If this is not the case, the method returns to the accept 1st protocol communication step. Otherwise, the method ends. When this step is performed, the building automation device always starts up using the first communication protocol for a certain time, allowing a gateway to install another appropriate communication protocol as desired.

Figures 6, 7:
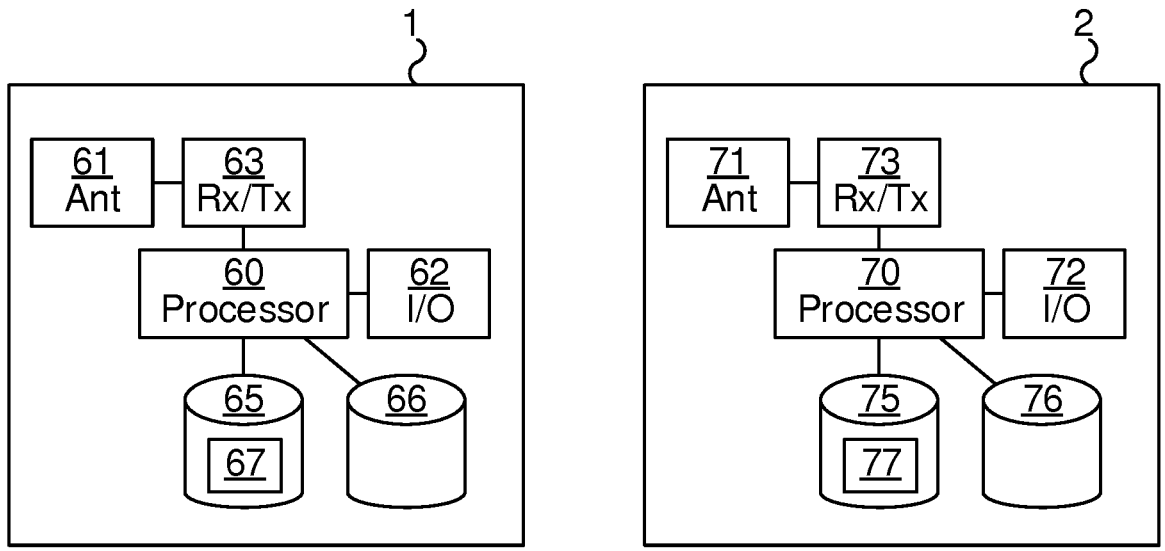
FIG. 6 is a schematic diagram showing some components of the gateway of FIG. 1 according to one embodiment.
FIG. 7 is a schematic diagram showing some components of a building automation device of FIG. 1.

FIG. 6 is a schematic diagram showing some components of the gateway 1 of FIG. 1 according to one embodiment. A processor 60 is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the method described with reference to FIG. 4.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The gateway 1 further comprises an I/O interface 62 for communicating with other external entities. Optionally, the I/O interface 62 also includes a user interface.

The gateway 1 also comprises one or more transceivers 63, comprising analogue and digital components, and a suitable number of antennas 61 for wireless communication with building automation devices 2.

Other components of the gateway 1 are omitted in order not to obscure the concepts presented herein.

FIG. 7 is a schematic diagram showing some components of a building automation device 2 of FIG. 1. A processor 70 is provided using any combination of one or more of a suitable central processing unit (CPU), multiprocessor, microcontroller, digital signal processor (DSP), application specific integrated circuit etc., capable of executing software instructions 77 stored in a memory 75, which can thus be a computer program product. The processor 70 can be configured to execute the method described with reference to FIG. 5.

The memory 75 can be any combination of read and write memory (RAM) and read only memory (ROM). The memory 75 also comprises persistent storage, which, for example, can be any single one or combination of magnetic memory, optical memory, solid state memory or even remotely mounted memory.

A data memory 76 is also provided for reading and/or storing data during execution of software instructions in the processor 70. The data memory 76 can be any combination of read and write memory (RAM) and read only memory (ROM).

The building automation device 2 further comprises an I/O interface 72 for communicating with other external entities. Optionally, the I/O interface 72 also includes a user interface.

The building automation device 2 also comprises one or more transceivers 73, comprising analogue and digital components, and a suitable number of antennas 71 for wireless communication with a gateway 1. Executable software instructions (see 15 of FIGS. 2A and 3) can be installed in the building automation device 2 to thereby provide support for an additional communication protocol. These executable software instructions can be firmware, e.g. provided in the transceiver 73 and/or as part of the executable software instructions 77 in the memory 75.

Other components of the building automation device 2 are omitted in order not to obscure the concepts presented herein.

Figure 8:
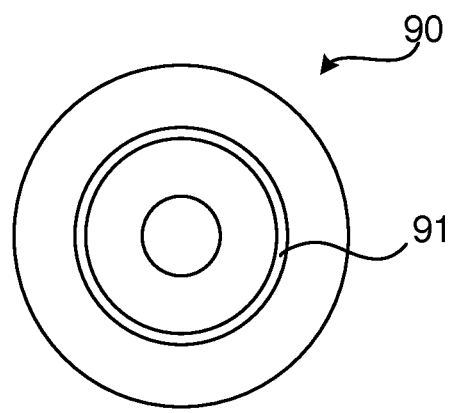
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 6 or 75 or the computer program product 75 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for managing communication with a building automation device, the method being performed in a gateway and comprising the steps of:

establishing communication with the building automation device over a first communication protocol;

installing executable software instructions on the building automation device over the first communication protocol to provide a capability to communicate over a second communication protocol;

establishing communication with the building automation device over the second communication protocol; and after communication over the second communication protocol has been established, accepting communication over the first communication protocol for a predetermined duration when the building automation device is powered on.

2. The method according to claim 1, wherein the first communication protocol and the second communication protocol comprise media access control (MAC) level protocols.

3. The method according to claim 1, wherein the first communication protocol and the second communication protocol comprise physical level protocols.

4. The method according to claim 1, wherein the second communication protocol comprises a later revision of the first communication protocol.

5. A gateway for managing communication with a building automation device, the gateway comprising:
   a processor; and
   a memory configured to store instructions that, when executed by the processor, are configured to cause the gateway to:
   establish communication with the building automation device over a first communication protocol;
   install executable software instructions on the building automation device over the first communication protocol to provide a capability to communicate over a second communication protocol;
   establish communication with the building automation device over the second communication protocol; and
   after communication over the second communication protocol has been established, accept communication over the first communication protocol for a predetermined duration when the building automation device is powered on.

6. The gateway according to claim 5, wherein the first communication protocol and the second communication protocol comprise media access control (MAC) level protocols.

7. The gateway according to claim 5, wherein the first communication protocol and the second communication protocol comprise physical level protocols.

8. The gateway according to claim 5, wherein the second communication protocol comprises a later revision of the first communication protocol.

9. A computer program for managing communication with a building automation device, the computer program comprising computer program code which, when run on a gateway is configured to cause the gateway to:
   establish communication with the building automation device over a first communication protocol;
   install executable software instructions on the building automation device over the first communication protocol to provide a capability to communicate over a second communication protocol;
   establish communication with the building automation device over the second communication protocol; and
   after communication over the second communication protocol has been established, accept communication over the first communication protocol for a predetermined duration when the building automation device is powered on.

10. A computer program product comprising the computer program according to claim 9 and a computer readable medium on which the computer program is stored.

11. A method for managing communication with a gateway, the method being performed in a building automation device and comprising the steps of:
   establishing communication with the gateway over a first communication protocol;
   receiving, from the gateway over the first communication protocol, a command to install a capability to communicate over a second communication protocol;
   receiving executable software instructions configured for communication over the second communication protocol;
   installing the executable software instructions to provide the capability to communicate over the second communication protocol;
   establishing communication with the gateway over the second communication protocol; and
   after communication over the second communication protocol has been established, accepting communication over the first communication protocol for a predetermined duration when the building automation device is powered on.

12. A building automation device for managing communication with a gateway, the building automation device comprising:
   a processor; and
   a memory storing instructions that, when executed by the processor, are configured to cause the building automation device to:
   establish communication with the gateway over a first communication protocol;
   receive, from the gateway over the first communication protocol, a command to install a capability to communicate over a second communication protocol;
   receive executable software instructions to be used for communication over the second communication protocol;
   install the executable software instructions to provide the capability to communicate over the second communication protocol;
   establish communication with the gateway over the second communication protocol; and
   after communication over the second communication protocol has been established, accept communication over the first communication protocol for a predetermined duration when the building automation device is powered on.

13. A computer program for managing communication with a gateway, the computer program comprising computer program code which, when run on a building automation device is configured to cause the building automation device to:
   establish communication with the gateway over a first communication protocol;
   receive, from the gateway over the first communication protocol, a command to install a capability to communicate over a second communication protocol;
   receive executable software instructions required for communication over the second communication protocol;
   install the executable software instructions to provide the capability to communicate over the second communication protocol;
   establish communication with the gateway over the second communication protocol; and
   after communication over the second communication protocol has been established, accept communication over the first communication protocol for a predetermined duration when the building automation device is powered on.

14. A computer program product comprising the computer program according to claim 13 and a computer readable medium on which the computer program is stored.

* * * * *